United States Patent
Clark et al.

(10) Patent No.: US 8,878,871 B2
(45) Date of Patent: Nov. 4, 2014

(54) METHODS AND APPARATUS FOR GEOSPATIAL MANAGEMENT AND VISUALIZATION OF EVENTS

(75) Inventors: Abraham J. Clark, Miami, FL (US); John-Isaac Clark, Dale City, VA (US); Jordon Mears, Alexandria, VA (US)

(73) Assignee: Thermopylae Sciences and Technology, North Arlington, VA (US)

( * ) Notice: Subject to any disclaimer, the term of this patent is extended or adjusted under 35 U.S.C. 154(b) by 90 days.

(21) Appl. No.: 13/206,431

(22) Filed: Aug. 9, 2011

(65) Prior Publication Data
US 2012/0038633 A1 Feb. 16, 2012

Related U.S. Application Data

(60) Provisional application No. 61/371,919, filed on Aug. 9, 2010.

(51) Int. Cl.
*G09G 5/00* (2006.01)
*G06T 17/05* (2011.01)
*G06Q 10/06* (2012.01)

(52) U.S. Cl.
CPC ............. *G06T 17/05* (2013.01); *G06Q 10/06* (2013.01)
USPC ........... 345/629; 345/419; 345/636; 345/634; 345/633; 707/756; 707/764; 707/729

(58) Field of Classification Search
CPC ............. G09G 5/14; G09G 2340/10; G09G 2340/125; G06T 11/60; G06T 15/503
USPC .......... 345/419, 629, 636, 634; 707/756, 764, 707/729, 721, 999
See application file for complete search history.

(56) References Cited

U.S. PATENT DOCUMENTS

| | | | |
|---|---|---|---|
| 6,307,573 B1 * | 10/2001 | Barros | 715/764 |
| 6,670,908 B2 * | 12/2003 | Wilson et al. | 342/26 R |
| 6,999,876 B2 * | 2/2006 | Lambert et al. | 702/2 |
| 7,373,612 B2 * | 5/2008 | Risch et al. | 715/850 |
| 7,743,064 B2 * | 6/2010 | Faulkner et al. | 707/758 |
| 7,797,019 B2 * | 9/2010 | Friedmann | 455/556.1 |
| 7,933,929 B1 * | 4/2011 | McClendon et al. | 707/802 |
| 8,120,473 B2 * | 2/2012 | Rennie et al. | 340/426.16 |
| 8,185,132 B1 * | 5/2012 | Katpelly et al. | 455/456.1 |
| 8,201,089 B2 * | 6/2012 | Perrow et al. | 715/273 |
| 8,284,037 B2 * | 10/2012 | Rennie et al. | 340/426.16 |
| 2004/0044553 A1 * | 3/2004 | Lambert et al. | 705/7 |
| 2005/0004944 A1 * | 1/2005 | Cossins et al. | 707/104.1 |
| 2005/0012743 A1 * | 1/2005 | Kapler et al. | 345/419 |

(Continued)

*Primary Examiner* — Abderrahim Merouan
(74) *Attorney, Agent, or Firm* — MH2 Technology Law Group, LLP

(57) ABSTRACT

Methods and apparatus are provided for geospatial management and visualization of events, by presenting a dynamic, user-interactive geospatial environment for performing real-time operations management and pre/post-mission analytical activities. A geospatial event management system integrates geospatial imagery data from geospatial imagery data sources, and determines a geographic area of interest based on user input, stored settings, or other relevant parameters. The geospatial event management system then provides a user-interactive geospatial environment based on the geospatial imagery data associated with the geographic area of interest, and ingests geospatially-referenced event data associated with the events, such as tracking data, telemetry data, or sensor data. The geospatial event management system further filters the event data based on parameters such as geospatial or temporal parameters, and then superimposes the filtered event data over the geospatial imagery data associated with the geographic area of interest.

11 Claims, 15 Drawing Sheets

(56) References Cited

U.S. PATENT DOCUMENTS

| | | |
|---|---|---|
| 2007/0288164 A1* | 12/2007 | Gordon et al. ............... 701/213 |
| 2008/0032703 A1* | 2/2008 | Krumm et al. ............ 455/456.1 |
| 2008/0132251 A1* | 6/2008 | Altman et al. ............... 455/457 |
| 2008/0133336 A1* | 6/2008 | Altman et al. ................. 705/10 |
| 2008/0189162 A1* | 8/2008 | Ganong et al. ................... 705/9 |
| 2008/0276201 A1* | 11/2008 | Risch et al. .................. 715/853 |
| 2009/0055719 A1* | 2/2009 | Cossins et al. ............... 715/204 |
| 2009/0094557 A1* | 4/2009 | Howard ....................... 715/848 |
| 2009/0112467 A1* | 4/2009 | Jiang et al. ................... 701/211 |
| 2009/0195650 A1* | 8/2009 | Hanai et al. .................. 348/143 |
| 2009/0216775 A1* | 8/2009 | Ratliff et al. ................... 707/10 |
| 2009/0284348 A1* | 11/2009 | Pfeffer .......................... 340/7.3 |
| 2009/0316966 A1* | 12/2009 | Marshall et al. .............. 382/128 |
| 2009/0319230 A1* | 12/2009 | Case et al. .................... 702/182 |
| 2010/0007669 A1* | 1/2010 | Bethune et al. ............... 345/520 |
| 2010/0023206 A1* | 1/2010 | Paquette et al. ................ 701/35 |
| 2010/0228577 A1* | 9/2010 | Cunningham et al. ........... 705/5 |
| 2010/0325563 A1* | 12/2010 | Goldthwaite et al. ........ 715/757 |
| 2011/0145257 A1* | 6/2011 | McDonald et al. ........... 707/743 |
| 2011/0153368 A1* | 6/2011 | Pierre et al. ....................... 705/4 |
| 2012/0224057 A1* | 9/2012 | Gill et al. ...................... 348/143 |
| 2012/0320089 A1* | 12/2012 | Kreft ............................ 345/629 |

\* cited by examiner

SENSITIVE BUT UNCLASSIFIED

BUREAU OF DIPLOMATIC SECURITY

U.S. Embassy Baghdad

August 25, 2007

SPOT REPORT - 000000-21

SENSITIVE BUT UNCLASSIFIED, PROTECT ACCORDINGLY

SUBJECT: ROCKETS FIRED OVER EMBASSY KABUL

REPORTING OFFICE: RSO Kabul

GEOCORDS:

DTG: 2007-08-25 18:20:00

SUMMARY: At 2250 hours on 8/24/07 and again at 0025 hours on 8/25/07, rockets were seen and heard traveling over the Embassy compound on a southeast to northwest trajectory. The first rocket was confirmed to be a 107mm which detonated approx. 200 meters northwest of the compound on the grounds of a local hospital. This caused a loud audible explosion. No injuries reported. The second rocket reportedly landed in the same vicinity. Details of detonation are not confirmed at this time.

RSO ACTION:
Post was in duck and cover status from 2250 until 2400 and again from 0025 until 0120. RSO, MSG and LGF reacted. Perimeter secured. All personnel accounted for. Embassy Annex facility under same status. RSO will notify as further information becomes available.

LOCATION: Kabul

DRAFTED BY: RSO Kabul

APPROVED BY:

WARNING: THIS REPORT IS THE PROPERTY OF THE U.S. EMBASSY BAGHDAD REGIONAL SECURITY OFFICE. NEITHER IT NOR ITS CONTENTS MAY BE DISCLOSED TO UNAUTHORIZED PERSONS WITHOUT THE EXPRESSED PERMISSION OF THE REGIONAL SECURITY OFFICE.

FIG. 3

| Color | Code | Definition | Lat. | Long. | MGRS | Actions |
|---|---|---|---|---|---|---|
| blue | B111 | Amb Residence 111 Training | 38.8982696593203 | -77.0551147460938 | 18S UJ 2178 0749 | |
| blue | B112 | Embassy 112 Training | 38.9048805286816 | -77.0520477294922 | 18S UJ 2206 0822 | |
| blue | B113 | Embassy 113 Training | 38.9047355651855 | -77.0674209594727 | 18S UJ 2073 0823 | |
| blue | B114 | Amb Residence 114 Training | 38.9088745117186 | -77.0590438842773 | 18S UJ 2146 0868 | |
| blue | B115 | Amb Residence 115 Training | 38.9078369140625 | -77.0685577392578 | 18S UJ 2064 0858 | |
| blue | B116 | Diplomatic Mission 116 Training | 38.904872076416 | -77.0372161865234 | 18S UJ 2335 0820 | |
| blue | B119 | Embassy 119 Training | 38.913688659668 | -77.0369720952148 | 18S UJ 2348 0916 | |
| blue | B121 | Amb Residence 121 Training | 38.8996353149414 | -77.0554809570312 | 18S UJ 2175 0764 | |
| blue | B123 | Embassy 123 Training | 38.9164428710938 | -77.0451354980469 | 18S UJ 2259 0949 | |
| blue | B125 | Embassy 125 Training | 38.9046783447266 | -77.0507583618164 | 18S UJ 2217 0819 | |
| blue | B127 | Embassy 127 Training | 38.9057769775391 | -77.0477981567383 | 18S UJ 2243 0831 | |
| blue | B129 | Embassy 129 Training | 38.9054412841797 | -77.053840637207 | 18S UJ 2191 0828 | |
| blue | B131 | Embassy 131 Training | 38.9040794372559 | -77.0471343994141 | 18S UJ 2248 0812 | |
| blue | B133 | Amb Residence 133 | 38.9086837768555 | -77.0601577758789 | 18S UJ 2137 0866 | |
| orange | O78 | Training | 38.794261932373 | -77.0253448486328 | 18S UH 2410 9569 | |
| orange | O79 | Training | 38.805949621582 | -77.0219345092773 | 18S UH 2443 9714 | |
| orange | O85 | Training | 38.9293632507324 | -77.1167068481445 | 18S UJ 1652 1106 | |
| orange | O86 | Training | 38.9007949829102 | -77.0702819824219 | 18S UJ 2047 0780 | |

FIG. 11

METHODS AND APPARATUS FOR GEOSPATIAL MANAGEMENT AND VISUALIZATION OF EVENTS

CLAIM OF PRIORITY

The present application relates to U.S. Provisional Application No. 61/371,919 filed Aug. 9, 2010, entitled "Methods and Apparatus for Geospatial Management and Visualization of Events," by Abraham J. Clark, John-Isaac Clark, and Jordon Mears, from which provisional application priority is claimed, and which provisional application is incorporated by reference herein.

FIELD

The present teachings relate generally to methods and apparatus for geospatial management and visualization of events, by providing a dynamic geospatial environment for performing real-time operations management and pre/post-mission analytical activities.

BACKGROUND

Humanitarian operations involving many different aid organizations are often undertaken in response to catastrophic disasters, particular those that strike developing parts of the world. For example, following the 2010 earthquake in Haiti that killed 220,000 people, international aid organizations rushed in to help the 300,000 people injured and over a million people displaced by the earthquake. Although many of the participating aid organizations possessed pertinent data and their own management practices, there did not exist any comprehensive understanding of other organizations' activities and data. Information was fragmented and held separately and locally, restricting an overall and up-to-date understanding of the situation. The breakdown of coordination and information sharing between the participating aid organizations resulted in delays in the transport and delivery of much needed aid. To exacerbate the problem, non-standardization of nomenclature made information sharing and logistics coordination even more difficult, particularly as more and more ad hoc tent cities, aid stations, and distribution points were being set up. For instance, English, French, and Caribbean languages like Creole were all commonly used in Haiti, so a single location could conceivably, and often did, have three separate names. In such an environment, collaborative sharing of accurate and relevant information would facilitate aid organizations in identifying locations that have duplicate names and coordinating their efforts to provide aid in a timely basis.

Collaborative sharing of relevant information can also be applied to other endeavors. For instance, with the climate of the world changing and more political envoys being dispersed world-wide, particularly in volatile regions of the world, the demand for security details or protective services is growing. As situations can change rapidly, the ability for these security details to gain situational awareness or assess potential threats to their clients and evaluate possible escape routes is paramount. These specially trained individuals need real-time, heads-up, accurate, and relevant information to maintain the safety of their clients and themselves.

SUMMARY

According to the present teachings in one or more aspects, methods and apparatus are provided for geospatial management and visualization of events. As described herein, a geospatial event management system provides a dynamic, user-interactive geospatial environment for performing real-time operations management and pre/post-mission analytical activities.

The geospatial event management system, according to exemplary embodiments of the present teachings, provides a framework for users to geospatially visualize and manage events, track personnel and assets, and gain situational awareness. The geospatial event management system can integrate current and legacy geospatial data from multiple sources to provide a comprehensive view of topography and composite situational awareness. The geospatial event management system can store the integrated data in accordance with an abstract data model, the integrated data including, for example, geospatial events, collections of objects, key/value text data stores, and the like. The geospatial event management system, in various embodiments, can determine a geographic area of interest based on user input, stored settings, or other relevant parameters, and then provide a user-interactive geospatial environment based on the geospatial imagery data associated with the geographic area of interest. The geospatial event management system can ingest geospatially-referenced event data associated with the events, such as tracking data, telemetry data, or sensor data, filter the event data based on parameters such as geospatial or temporal parameters, and present the filtered event data superimposed over the geospatial imagery data associated with the geographic area of interest.

The geospatial event management system can include or interface with one or more user applications, through which a user can (1) conduct pre-operational planning for a deployment of personnel (e.g., security details) or assets (e.g., aircrafts, vehicles, etc.) anywhere in the world; (2) obtain real-time operational support by gathering and viewing pertinent information on events within a geo-location; and (3) perform post-operational analysis by reviewing and analyzing the events and potential consequences or reactions to the presence of the deployed personnel or assets.

To facilitate pre-operational planning, the geospatial event management system can include a mission planner that assists a user in constructing mission information sheets for detailing an upcoming mission. Mission information sheets can include mission parameters and requirements, such as personnel, assets, waypoints, tracker identifications, and other details that affect or influence mission movements and timeline. The geospatial event management system can also include an image manager that facilitates a user in importing, viewing, and managing recently-acquired imagery that may be relevant to the planning or execution of a mission.

To provide real-time operational support, the geospatial event management system can include an operations monitor that provides real-time tracking and display of units and assets within a geospatial environment. The operations monitor can monitor one or more events within a geographical area, such as, for example, the entire world, a specific area of interest, a defined geo-radius covered by one or more designated transmitters, and the like. Users can utilize the operations monitor to monitor data ingestion, quickly access codebook lookup and emergency alerts, obtain and generate tactical overlays for Blue Force coding, perform range finding, perform geo-positioning via latitude/longitude and military grid reference system, and the like.

To facilitate post-operational analysis, the geospatial event management system can include a post-operational analyzer that receives spot reports for documenting events, provides a recap of routes and waypoints for mission review, and provides a complete playback of one or more missions with a display of indicators and imagery review.

Exemplary embodiments of the geospatial event management system enable users to rapidly develop and incorporate geospatial capabilities into systems already in operational use. By ingesting, categorizing, and integrating structured and/or unstructured geospatial data from multiple sources, the geospatial event management system can transform diverse geospatial data into meaningful information. For example, the geospatial event management system can enable users to visualize and exploit geospatially-referenced data in a two- or three-dimensional environment, integrate the information environment with kinetic and non-kinetic operations, and rapidly process, analyze, and disseminate pertinent information.

The geospatial event management system can integrate real-time data feeds and sensor data with static information, enhance decision capability with geo-referenced information and intelligence, create and manage the operational picture for a common visualization across domains, and link centers and distributed systems with a robust dissemination architecture. The geospatial event management system, in various embodiments, can serve as a physical security and blue force tracking system, document and media exploitation system, public health surveillance system, an information and intelligence analysis tool, etc., or a combination thereof.

DESCRIPTION OF THE DRAWINGS

The accompanying drawings, which are incorporated in and constitute a part of this specification, illustrate aspects of the present teachings and together with the description, serve to explain principles of the present teachings. In the figures:

FIG. 3 depicts an exemplary spot report generated by the geospatial event management system, in accordance with various embodiments of the present teachings;

FIGS. 4-13 illustrate screenshots of exemplary graphical user interface and geospatial environment associated with the geospatial event management system, according to an embodiment of the present teachings.

DETAILED DESCRIPTION

Reference will now be made in detail to exemplary embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific embodiments in which may be practiced. These embodiments are described in sufficient detail to enable those skilled in the art to practice these embodiments and it is to be understood that other embodiments may be utilized and that changes may be made without departing from the scope of the present teachings. The following description is, therefore, merely exemplary.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1A:
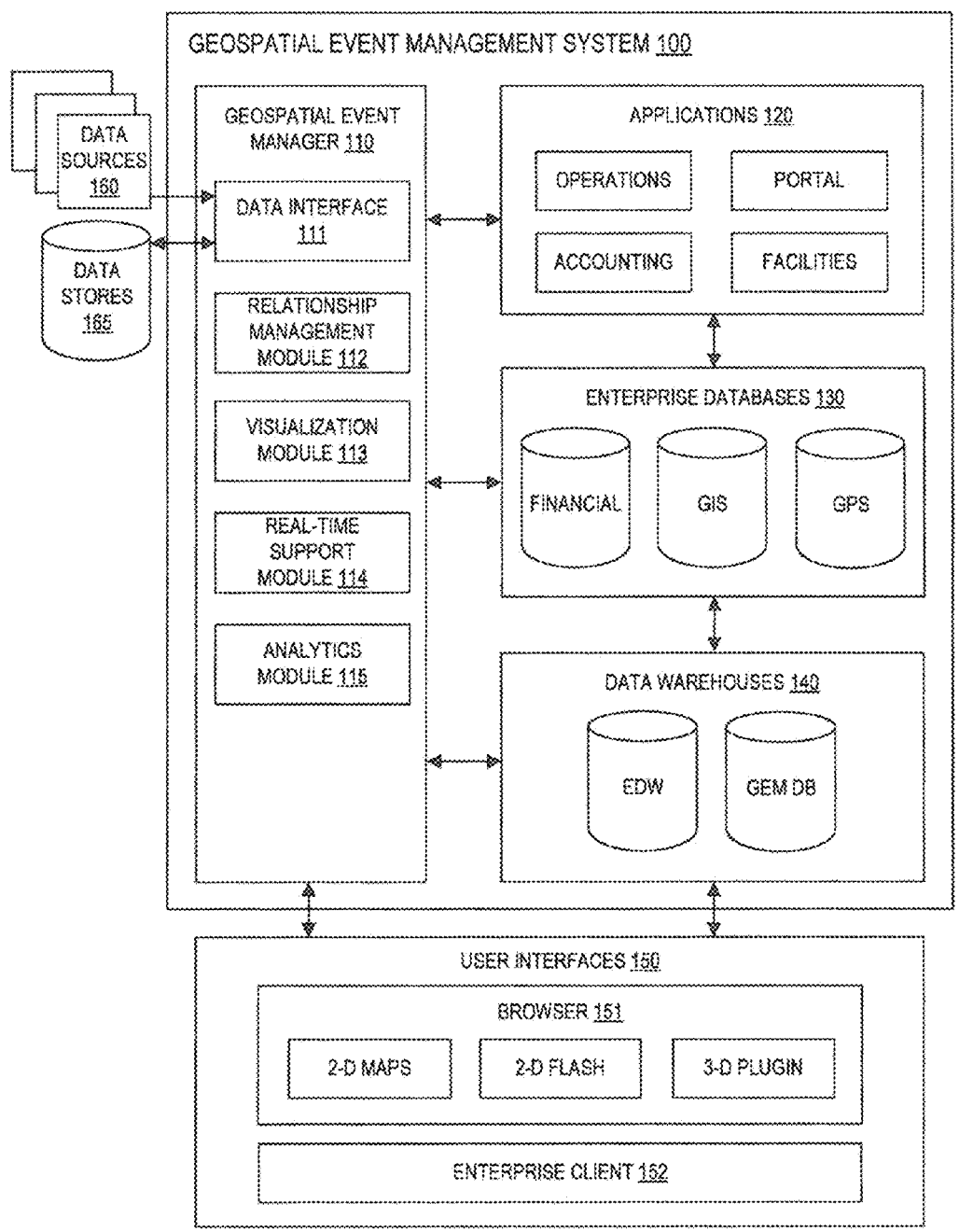
FIG. 1A illustrates an exemplary geospatial event management system that provides a dynamic geospatial environment for performing real-time operations management and pre/post-mission analytical activities, consistent with various embodiments of the present teachings.

FIG. 1A illustrates an exemplary embodiment of a geospatial event management system 100 that provides a framework for users to geospatially visualize and manage events, track personnel and assets, and gain situational awareness. Users can include, for example, organizations, agencies, units, groups, entities, individuals such as operatives and analysts, and the like. More particularly, in various aspects, and as generally shown in the figures, platforms and techniques are provided to offer a dynamic geospatial environment for users to perform both real-time operations management and pre/post-mission analytical activities.

Geospatial event management system 100 operates to transform diverse geospatial data into meaningful information by ingesting, categorizing, and integrating structured and/or unstructured geospatial data from multiple sources. For example, geospatial event management system 100 can enable users to visualize and exploit geospatially-referenced data in a two- or three-dimensional environment, integrate the information environment with kinetic and non-kinetic operations, and rapidly process, analyze, and disseminate pertinent information.

In an embodiment as shown in FIG. 1A, geospatial event management system 100 can include a geospatial event manager 110 that provides back-end and/or middleware services, and can be adapted to interface with various data sources and data consumers, such as applications 120, enterprise databases 130, data warehouses 140, and user interfaces 150. Each of applications 120, enterprise databases 130, data warehouses 140, and user interfaces 150 can serve as a data source, a data consumer, or both. Data sources can also include native data sources, visualization libraries, and other sources of data such as data sources 160 and data stores 165. Exemplary data sources include data feeds (e.g., Keyhole Markup Language feeds) and streams, a data sensor network, geo-tracking units, a geographic information system (GIS), a global positioning system (GPS), mobile messaging devices, manual input, and the like.

In exemplary embodiments, geospatial event management system 100 incorporates a flexible framework built on an open, interoperable architecture to facilitate secure ingestion, storage, presentation, and dissemination of information to support critical intelligence and operations requirements. The architecture is composed of inter-related layers, such as information ingestion, data storage, geospatial processing, and presentation layers. Furthermore, geospatial event management system 100 can leverage, enhance, and augment existing resources that are already operational and deployed in the field, the existing resources providing many important elements required in geospatial event management system 100. Geospatial event management system 100 can also utilize modular controllers to integrate and/or aggregate data from various sources and store the integrated data in accordance with an abstract data model, the integrated data including, for example, geospatial events, collections of objects, key/value text data stores, and the like. Modular controllers can implement and/or extend open standards such as, for example, a representational state transfer (REST) interface (e.g., REST Hypertext Transfer Protocol), Hypertext Preprocessor interfaces and objects, a Simple Object Access Protocol messaging framework, remote procedure call protocols, a JavaScript Object Notation standard, a Keyhole Markup Language standard, a Resource Description Framework data model, and the like.

Geospatial event management system 100 can ingest, process, and integrate data from one or more data sources, and provide the integrated data to one or more data consumers. For example, geospatial event manager 110 can process and integrate data received or retrieved from applications 120, enterprise databases 130, data warehouse 140, and/or external data sources such as data sources 160 and data stores 165, and geospatially display the integrated data over relative maps and imagery via user interfaces 150. Geospatial event management system 100 is capable of integrating and displaying numerous data types from a myriad of sensor platforms. Geospatial event manager 110 can provide the integrated data to applications 120 or other analytical systems for further analysis, store the integrated data in enterprise databases 130 and/or data warehouses 140, and the like. Applications 120 can include applications for operations, accounting, portals, facilities, and/or other types of applications known to one skilled in the art. Enterprise databases 130 can include a financial database, a GIS database, a GPS database, and/or other types of databases know to one skilled in the art. Data warehouses 140 can include an enterprise data warehouse, a global environmental multiscale model database, and/or other types of data warehouses known to one skilled in the art.

As shown in FIG. 1A, geospatial event manager 110 can include a data interface 111, a relationship management module 112, a visualization module 113, a real-time support module 114, and an analytics module 115, to perform information ingestion and geospatial processing. Geospatial event manager 110 can utilize one or more of modules 111-115 to provide a variety of features that support mission planning and geospatial visualization. Services provided by geospatial event manager 110 can combine geospatial and other data from multiple sources into a composite two- or three-dimensional geo-temporal user-definable interface for visualization, exploitation, analysis, and operations management. In doing so, geospatial event management system 100 can provide a common visualization service through which geospatial and other data can be exposed and employed for visualization, thus enabling multiple users to interact in real-time and analyze geospatial data in a collaborative manner. For example, geospatial event manager 110 can utilize a GOOGLE EARTH geospatial data interface and processing software to provide a rich, interactive three-dimensional globe or a two-dimensional browser-based map on which dynamic and static data can be processed and displayed along with custom overlays and models.

In various embodiments, data interface 111 can receive, retrieve, and/or access static and dynamic data from various sources. For example, data interface 111 can retrieve or access data from applications 120, enterprise databases 130, data warehouses 140, and/or user interfaces 150. For another example, data interface 111 can receive a stream of data from data sources 160, such as IRIDIUM-based tracking devices that transmit the location of personnel or mobile assets (e.g., aircrafts, vehicles, etc.) to a satellite network and then to a ground location. Once the data is passed to geospatial event manager 110, data interface 111 can format, integrate, aggregate, and/or store the data for processing by relationship management module 112, retrieval and rendering by visualization module 113 or real-time support module 114, analysis by analytics module 115, and the like. Geospatial event management system 100 can include an image manager that allows for modification and management of imagery and vector assets to best support the users' missions. Full control over current and historical imagery, terrain, two- and three-dimensional models/buildings, vehicle models, and relevant vector layers is enabled though management and integration with, for example, the GOOGLE EARTH FUSION toolset. Geospatial event management system 100 can also utilize abstract data modeling and relationship management to provide geo-enablement of non-geographical data.

According to various embodiments, geospatial event management system 100 can provide multiple presentation layer integration options, such as acting as a visualization service for existing applications, providing a standalone visualization service, function as a two- and three-dimensional web-based and desktop client, and the like. Geospatial event management system 100 offers a flexible architecture that is fully scalable and extendable, and can be integrated with systems already in operational use. Geospatial event management system 100 can be fully web-based and can scale from a world-wide support configuration (e.g., supporting thousands of users across the world) to a single-machine stand-alone configuration supporting a single user.

As shown in FIG. 1A, geospatial event management system 100 can incorporate user interfaces 150 that provide one or more intuitive interfaces for users to review and interact with different types of data from various data sources. User interfaces 150 can be implemented on any number of clients that run on any operating system, such as MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, IBM AIX, and other operating systems known to one skilled in the art. User interfaces 150 can interact with users via a browser 151, such as INTERNET EXPLORER, CHROME, FIREFOX, SAFARI, and the like. Browser 151 can utilize one or more browser plug-ins, such as the GOOGLE EARTH plug-in, the ADOBE FLASH PLAYER plug-in, and/or other two- and three-dimensional browser plug-ins known to one skilled in the art. User interfaces 150 can also interact with users via an enterprise client 152, such as GOOGLE EARTH APPLICATION and/or clients built on, for example, GOOGLE EARTH technology, which has a set of capabilities such as zooming-in and out of various locations, tilting the view for over-the-horizon perspectives, panning on a certain area, and the like. Users can select an area of the globe that they typically work in and save it as their "home" when they log-on to geospatial event management system 100.

Exemplary embodiments of geospatial event management system 100 can also incorporate temporal functions that allow users to scroll back and forth through time and playback via user interfaces 150 a series of events that occurred during a span or window of time. Additionally, geospatial event management system 100 can display via user interfaces 150 significant archived events that occurred during the user-defined temporal window if the events are in the users' field of view. Users can select one or more sensors to review information provided by the selected sensors pertaining to a tracked personnel or device within a temporal span or window. Examples of information provided by the sensors include a status (e.g., en route to venue, dropped off principal at venue, returning from venue, under hostile fire, etc.) of the tracked personnel or device and information about heading, speed, altitude, and other pertinent information.

Furthermore, geospatial event management system 100 enables users to store individual mission/role preferences for data sources (e.g., sensors on mobile assets) and geographic areas that they are interested in tracking and filter and customize their user-defined operating picture. The maps and images accessible to users can be managed locally but can also be extended by concurrently integrating community globe information using server-side resources such as, for example, GOOGLE EARTH products provided by the National Geospatial-Intelligence Agency, and sharing maps and images via secure networks such as the Secret Internet Protocol Router Network, the Joint Worldwide Intelligence Communications System, and the like. Additional exemplary server-side resources can include GOOGLE EARTH SERVER, Hypertext Preprocessor, the JAVA platform, JAVASCRIPT, POSTGRESQL, POSTGIS, PLPYTHON, LINUX-based web servers, and other server-side resources known to one skilled in the art. Users can toggle the visibility of these underlying imagery or maps resources depending on the requirements of their mission. Geospatial event management system 100 can include several dynamic standard overlays to aid the user in analysis and real-time operations support, such as a military grid reference system grid overlay, a latitude/longitude overlay, and a dynamic range card which adjusts automatically based on the users' selected zoom level.

In various embodiments, geospatial event management system 100 can include a post-operational analyzer that allows users to create reports about their operating environment, save the reports with geospatial and temporal filters, and conduct historical analyses to analyze specific types of activity occurring around certain areas at certain times. Users have the ability to query historical data stored in one or more data repositories (e.g., enterprise databases 130, data warehouses 140, data stores 165) and review patterns of routes and the activity along those routes. When a potential mission is in the planning phase, geospatial event management system 100 allows for the pertinent information to be saved in a data repository. That information can be referenced in the future during the mission in the event that the user is interested in the specifics, such as names of individuals involved in the mission, their contact information (e.g., cell phone numbers) and intended destination, etc. In addition to mission planning sheets, users can use geospatial event management system 100 to fill out spot reports if information of interest arises. For example, if there is a hostile event in one part of a city and a user is aware of it, the user can write up a spot report detailing the hostile event. As shown in FIG. 3, an exemplary spot report can include details pertaining to an event, such as when and where the event took place, the parties involved, and other relevant details. The user has the ability to label any of the free-text in the comments, for easy storage of that data and future retrieval.

Figure 1B:
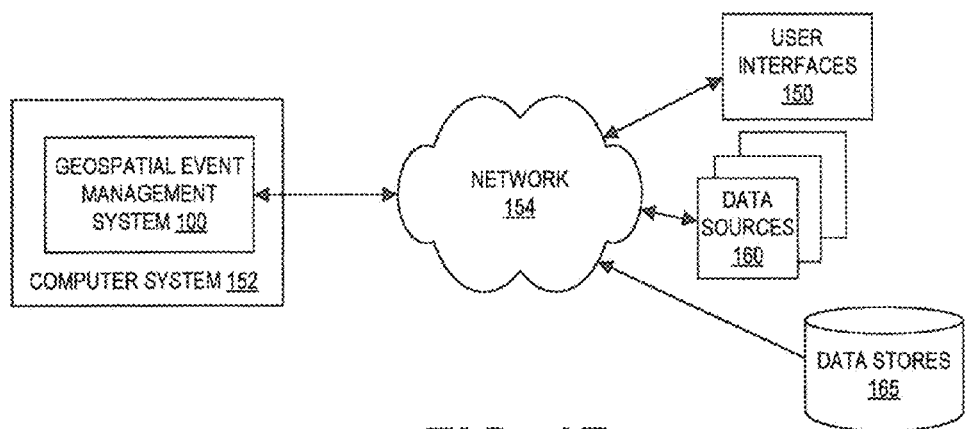
FIGS. 1B and 1C illustrate various embodiments of the geospatial event management system, consistent with various embodiments of the present teachings.

According to embodiments, geospatial event management system 100 can be implemented on any type of computer system, such as server computers, desktop computers, thin clients, virtual machines, laptops, mobile devices, tablet computers, smartphones, personal digital assistants, and the like. The computer system can include the components of a conventional computer system, for example, components as described below in FIG. 14. In embodiments, the computer system implementing geospatial event management system 100 can be configured to operate in conjunction with other computer systems. As illustrated in FIG. 1B, for example, geospatial event management system 100 can be implemented on a computer system 152 that is coupled to a network 154. Network 154 can include one or more communication networks, such as a local area network, a wide area network, the Internet, a cloud-based network, and the like. In this example, geospatial event management system 100 can provide and/or communicate with the user via network 154. For instance, geospatial event management system 100 can communicate with the user via a network based interface, such as user interfaces 150. As such, the user can utilize geospatial event management system 100, via user interfaces 150, from a remote computer system coupled to network 154. Additionally, geospatial event management system 100 can communicate with data sources 160 and/or data stores 165 via network 154. For instance, user interfaces 150, data sources 160, and/or data stores 165 can be supported by one or more remote computer systems coupled to network 154.

In the example illustrated in FIG. 1B, geospatial event management system 100 can provide user interface 150 via network 154 to a user of a remote computing system. Likewise, for example, geospatial event management system 100 can be locally stored and executed on a computer system of the user. As such, geospatial event management system 100 can provide user interfaces 150 as a graphical user interface to allow the user to utilize geospatial event management system 100. Likewise, while data sources 160 and data stores 165 are illustrated as being remotely located from geospatial event management system 100, any of data sources 160, data repositories 165, and/or other types of data sources can be implemented locally on the computer system implementing geospatial event management system 100. One skilled in the art will realize that geospatial event management system 100, user interfaces 150, data sources 160, and data stores 165, can be implemented on any type of computer system or systems configured in any type of arrangement.

Figure 1C:
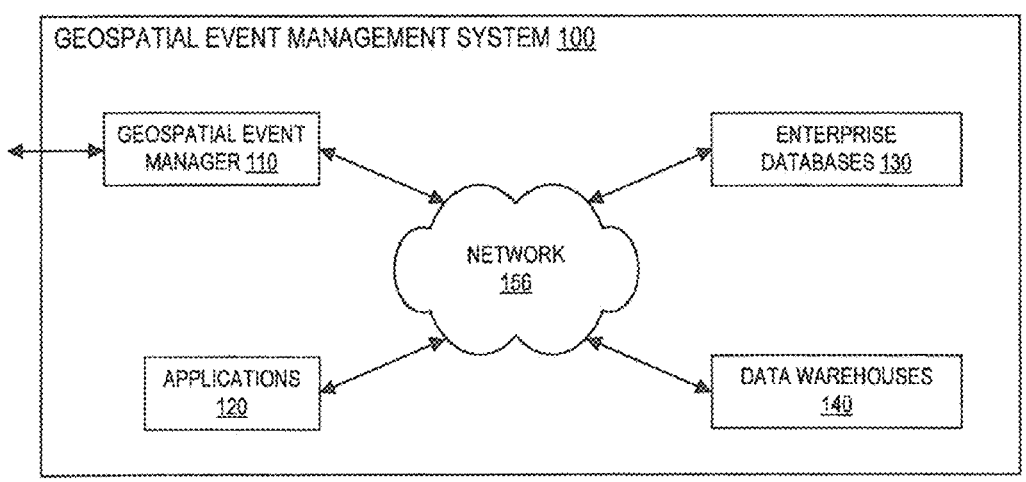
Figure 14:
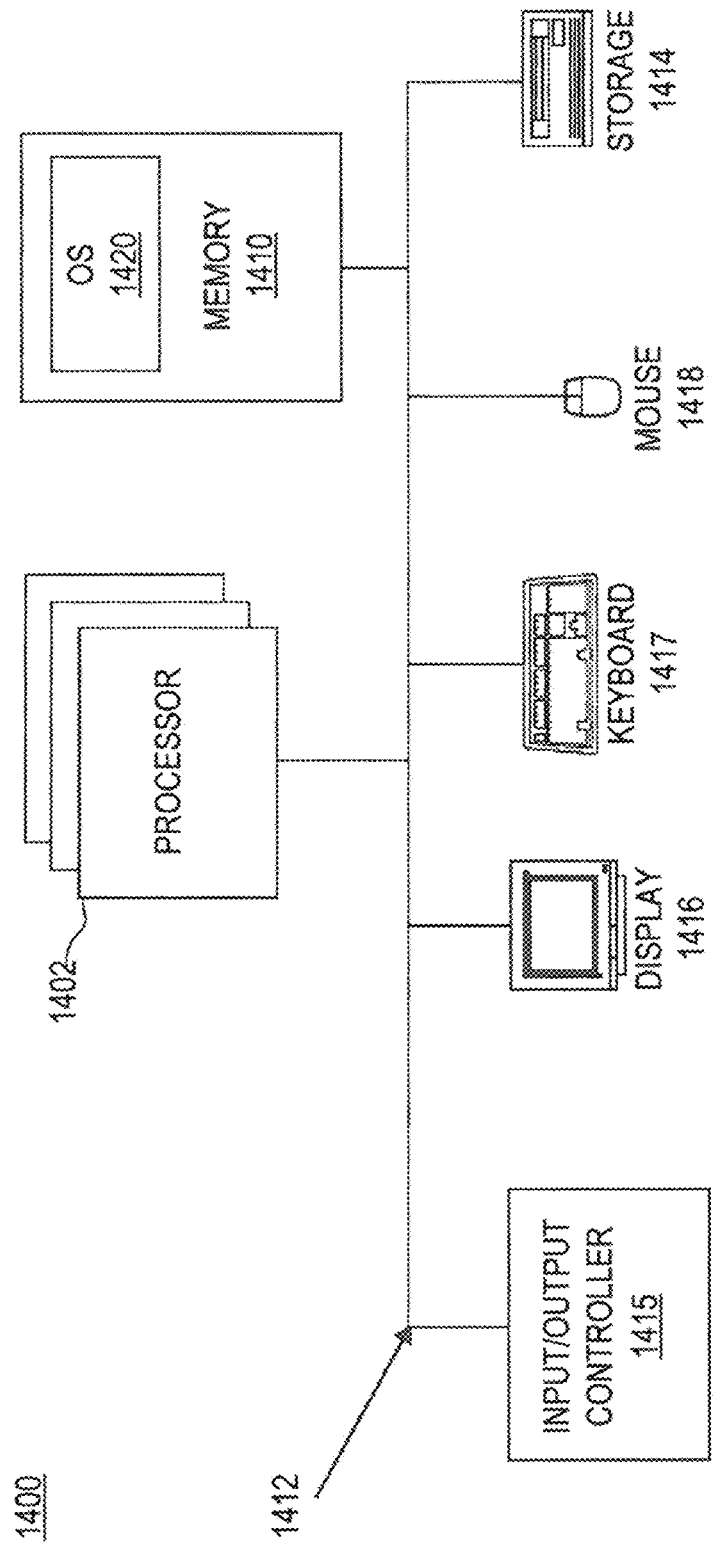
FIG. 14 illustrates a computer system that is consistent with embodiments of the present teachings.

In embodiments, geospatial event management system 100 can be implemented as an application program that is capable of being stored on and executed by an type of computer system, for example, as illustrated in FIG. 14. Geospatial event management system 100 can be written in a variety of programming languages, such as JAVA, C++, Python code, VISUAL BASIC, HTML, XML, and the like to accommodate a variety of operating systems, computing system architectures, etc. The modules and/or components of geospatial event management system 100 can be implemented in a single application program capable of executing on any type of computer systems. Likewise, the modules and/or components of geospatial event management system 100 can be implemented as separate application programs that are capable of executing on separate computer systems. For example, as illustrated in FIGS. 1A and 1C, the modules and/or components in geospatial event management system 100, such as geospatial event manager 110, applications 120, enterprise databases 130, and/or data warehouses 140, can be separate and can communicate via one or more communication networks 156. While FIGS. 1A and 1C illustrate all the modules and/or components in geospatial event management system 100 are separate, any number of the modules and/or components in geospatial event management system 100 can be separate and/or located in the same application program.

Exemplary embodiments of geospatial event management system 100, such as those described herein and illustrated in FIGS. 1A-C, are intended to present concepts in a concrete fashion and are described in sufficient detail to enable those skilled in the art to practice these embodiments. However, other embodiments can be utilized and changes can be made without departing from the scope of the present teachings.

Figure 2:
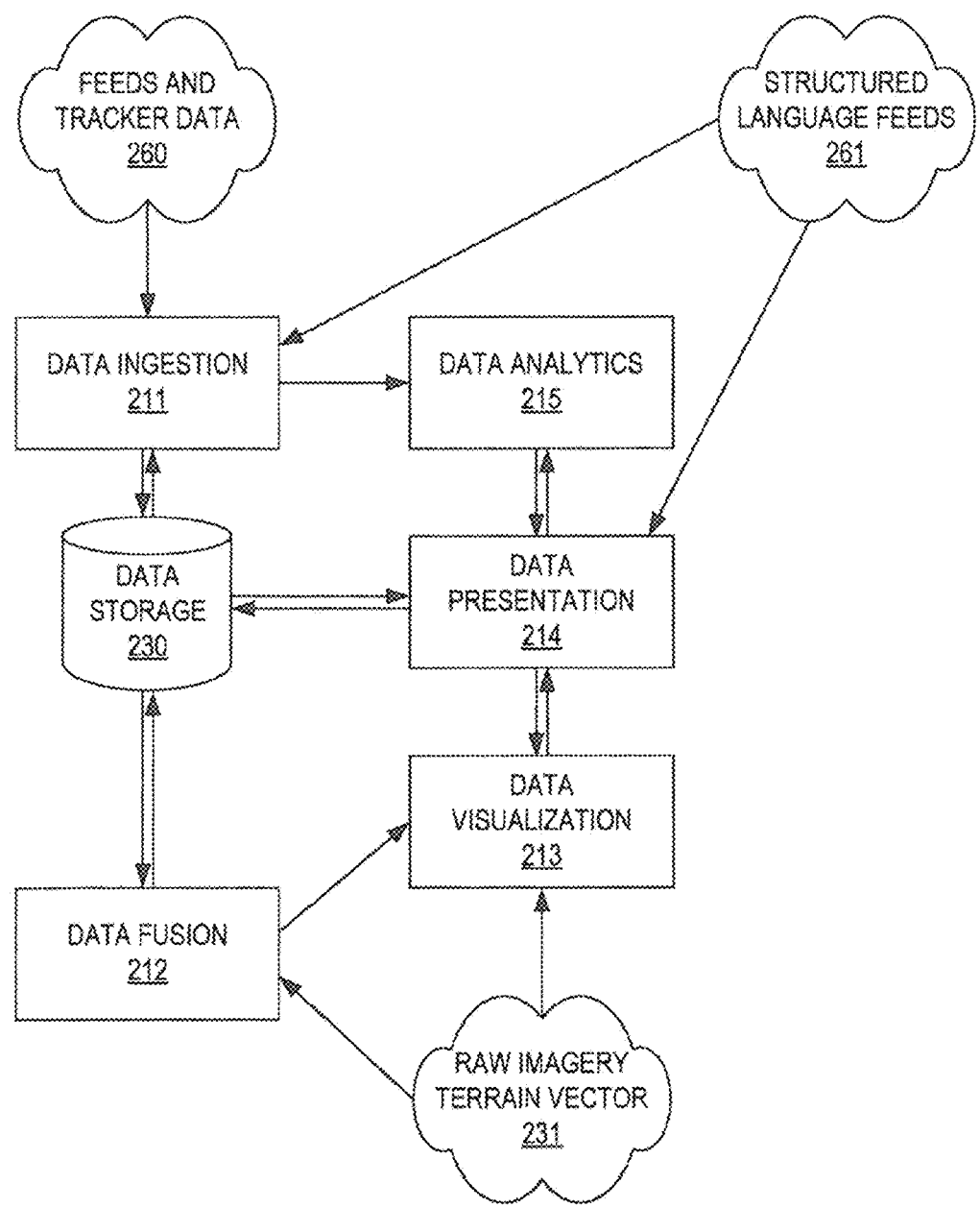
FIG. 2 illustrates exemplary methodologies illustrating the relationship and workflow among various components of the geospatial event management system, consistent with various embodiments of the present teachings.

FIG. 2 illustrates exemplary methodologies illustrating the relationship and workflow among various components of geospatial event management system 100. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Geospatial event management system 100 can ingest, process, and integrate data from a variety of data sources, and provide the integrated data to one or more data consumers. For example, geospatial event management system 100 can access and ingest event data from various data sources, integrate/fuse the event data with geospatial data, render the integrated data over relative maps and imagery for display, provide the event and/or integrated data to analytical systems for analytics, store/retrieve the event and/or integrated data, and the like. In data ingestion 211 as shown in FIG. 2, geospatial event management system 100 can interface with and ingest and/or abstract data from various data sources, such as data storage 230, feeds and tracker data 260, and/or structured language feeds 261. Geospatial event management system 100 can utilize modular controllers to ingest, integrate, and/or abstract data from the various data sources and store the data in accordance with an abstract data model, the data including, for example, geospatial events, collections of objects, key/value text data stores, and the like. For instance, geospatial event management system 100 can use data interface 111 to interface with and ingest data from applications 120, enterprise databases 130, data warehouses 140, user interfaces 150, data sources 160, and/or data stores 165 as shown in FIGS. 1A-C. Data associated with geospatial events can be geospatially-referenced and can include tracking data, telemetry data, sensor data, and the like. Furthermore, geospatial event management system 100 can utilize abstract data modeling and relationship management to provide geo-enablement of non-geographical data.

In data fusion 212 and data visualization 213 as shown in FIG. 2A, geospatial event management system 100 can fuse, integrate, aggregate, or combine geospatial, event, and/or other data from multiple sources, such as data storage 230 and terrain vectors and models 231, into a composite two- or three-dimensional geo-temporal user-definable interface for visualization, exploitation, analysis, and operations management. For example, in data fusion 212, geospatial event management system 100 can retrieve ingested event data and/or other data, such as geospatial or temporal parameters and user preferences, and utilize relationship management module 112 to fuse the retrieved data with imagery and model data from terrain vectors and models 231. Geospatial event management system 100 can also filter the retrieved data based on the geospatial or temporal parameters and/or the user preferences.

In data visualization 213, geospatial event management system 100 can use visualization module 113 to provide a visualization service through which the fused data can be exposed and employed for visualization. For example, geospatial event management system 100 can utilize a GOGGLE EARTH geospatial data interface and processing software to provide a rich, interactive three-dimensional globe or a two-dimensional browser-based map on which dynamic and static data can be processed and fused with custom overlays and models.

Then, in data presentation 214, geospatial event management system 100 can display the fused data for visualization by one or more users, for example, via user interfaces 150 as shown in FIGS. 1A and 1B. Geospatial event management system 100 can further provide a common visualization service for multiple users, enabling those users to interact in real-time and analyze geospatial data in a collaborative manner. Geospatial event management system 100 can utilize real-time support module 114 to provide a variety of features for supporting mission planning and geospatial visualization by one or more users on a real-time basis. Users can select an area of the globe that they typically work in and save it as their "home" when they log-on to geospatial event management system 100. Geospatial event management system 100 can also include an image manager that allows for users to modify and manage imagery and vector assets to best support the user's missions. For example, users can zoom-in and out of various locations, pan on a certain area, tilt the view of a certain area for over-the-horizon perspectives, and the like. Full control over current and historical imagery, terrain, two- and three-dimensional models/buildings, vehicle models, and relevant vector layers is enabled though management and integration with one or more toolsets provided by real-time support module 114 and user interfaces 150.

In data presentation 214, users can utilize temporal functions provided by geospatial event management system 100 to scroll back and forth through time and playback a series of events. Additionally, geospatial event management system 100 can display significant archived events that occurred during the user-defined temporal window if the events are in the users' field of view. Geospatial event management system 100 is capable of integrating and displaying numerous types of data from a myriad of sensor platforms, and users can select one or more sensors to review information provided by the selected sensors pertaining to a tracked personnel or device within a temporal window. Furthermore, users can use geospatial event management system 100 to enter and store individual mission/role preferences for assets and geographic areas that they are interested in tracking, and filter and customize their user-defined operating picture. Users can toggle the visibility of underlying imagery or maps resources depending on the requirements of their mission.

In data analytics 215, geospatial event management system 100 can use analytics module 115 to allow users to create reports about their operating environment, save the reports with geospatial and temporal filters, and conduct historical analyses to analyze specific types of activity occurring around certain areas at certain times. Geospatial event management system 100 gives users the ability to query historical data stored in one or more data repositories (e.g., data storage 230) and review patterns of routes and the activity along those routes. In addition to mission planning sheets, users can use geospatial event management system 100 to fill out spot reports if information of interest arises. For example, if there is a hostile event in one part of a city and a user is aware of it, the user can write up a spot report detailing the hostile event, such as when and where the hostile event took place, the parties involved, and other relevant details.

According to embodiments described above and illustrated in FIGS. 1A-C and 2, geospatial event management system 100 can provide geospatial event management services to one or more types of users for any number of purposes, such as entity tracking, public safety and crisis response, public health surveillance, physical security and force protection, information analysis, and the like. Geospatial event management system 100 provides entity and force tracking capability for users to management operations from a two- or three-dimensional interactive environment and import up-to-date imagery. Exemplary tracking solutions include tracking signals from satellite phones, GPS devices, and other sensors; collecting broadcasts from remote assets; tagging, tracking, and locating; and displaying and managing one-way message and distress signals. Tracking solutions can provide complete sensor management, comprehensive tasking and mission management, generation of reports and exportation of tracker data in multiple formats, and more.

Using geospatial event management system 100, public safety officials can exploit the real-time geo-positioning capability to manage incidents, dispatch responders, and track department vehicles, aircrafts, and watercrafts; public safety officials and first responders can share real-time operational pictures and capture statistics, response times, and operational data to manage operations; and police, fire, and emergency medical services can integrate their command systems. In a further embodiment, geospatial event management system 100 can provide geospatial situation awareness for disease surveillance that public health officials can utilize to track outbreaks, detect new patterns, analyze and disseminate warnings, perform searches by topic, geographic location, time, etc., to quickly and accurately extract information from data sources and reports with advanced semantics and logic.

Figure 4:
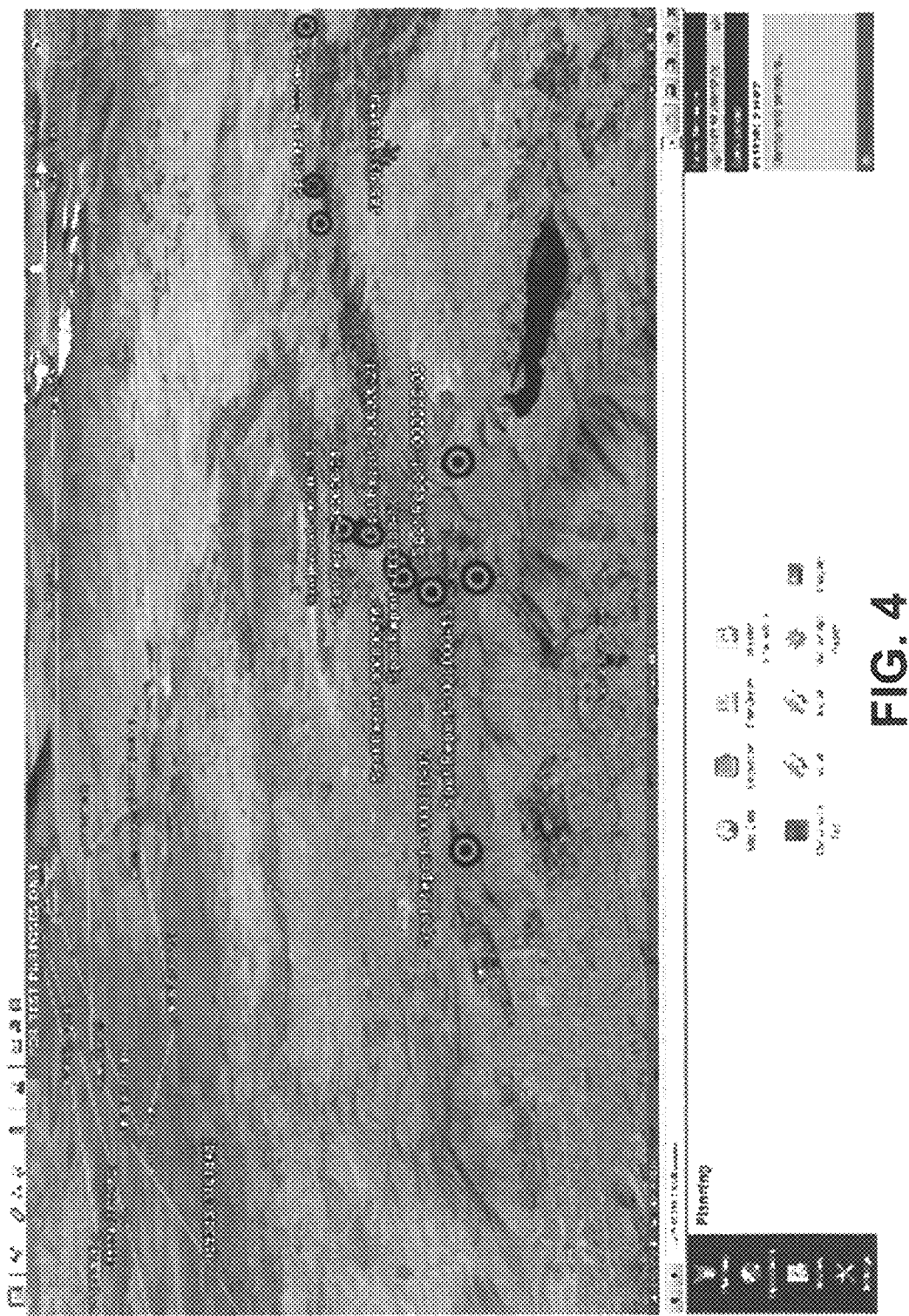
Figure 5:
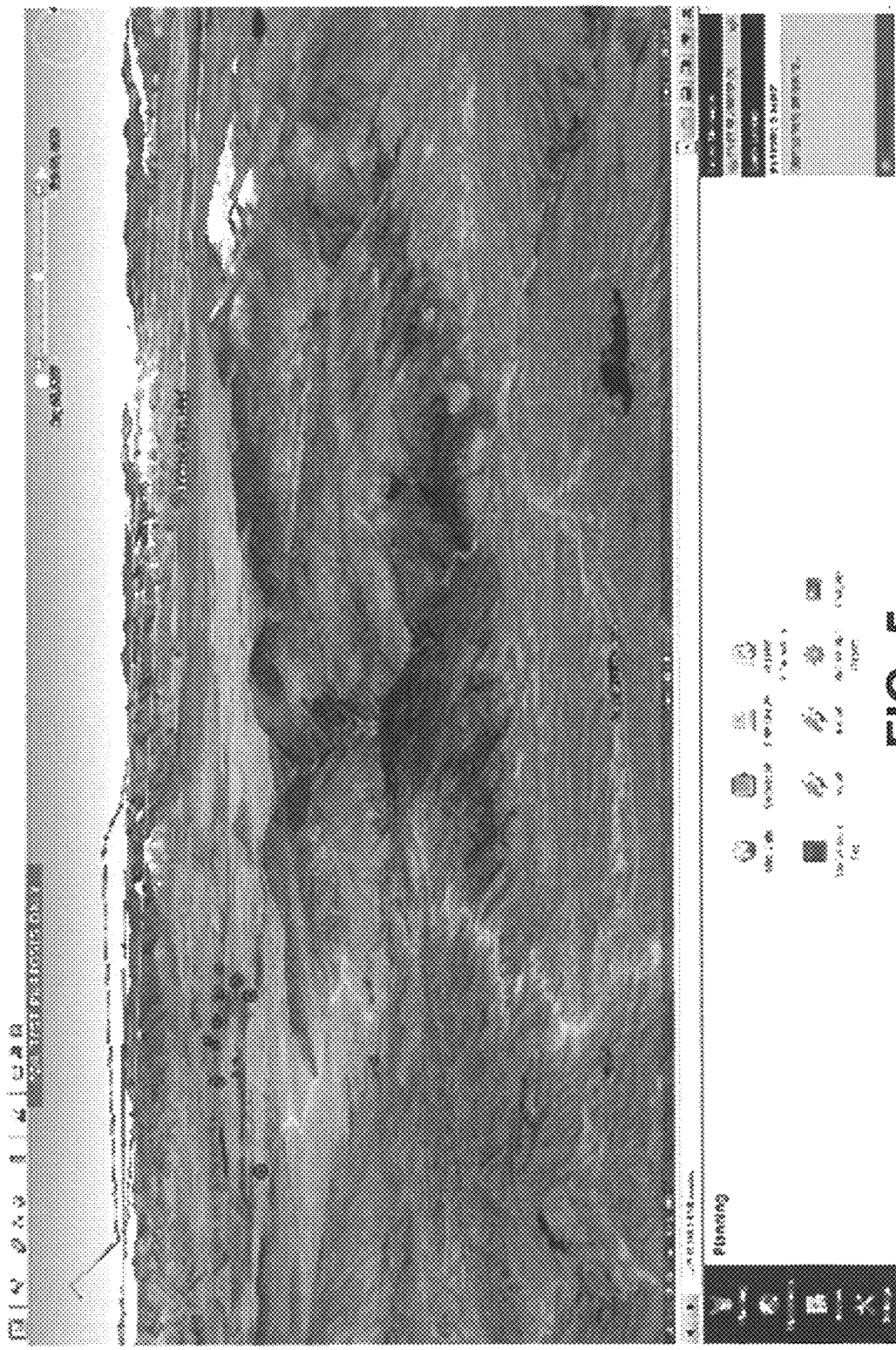
Figure 6:
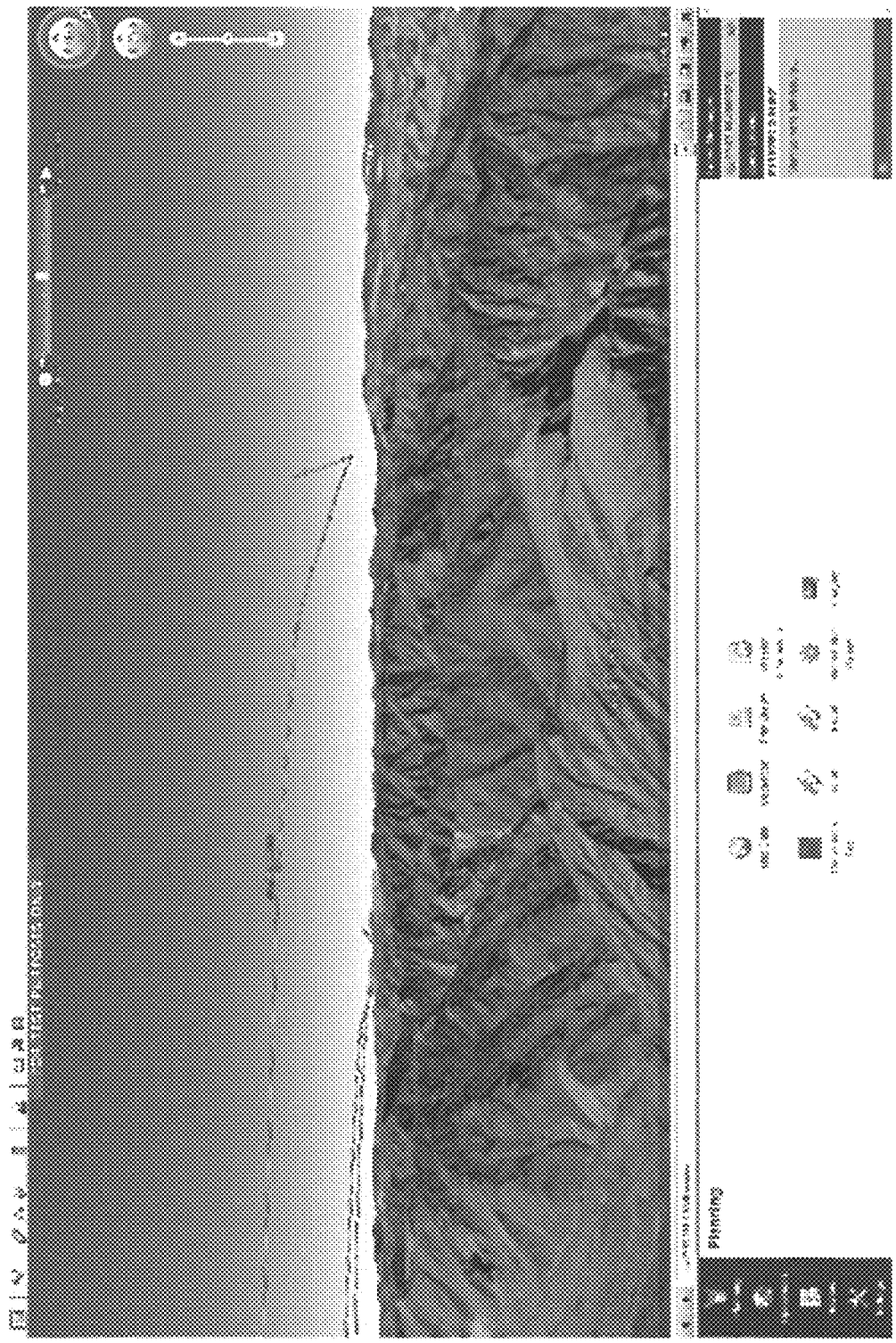

Using geospatial event management system 100, security professionals can exploit the sensor integration capability to monitor facility/area penetration sensors and visualize intrusion systems, closed-circuit televisions, and other monitors. When combined with the data integration capability, security professionals can track physical, multimedia, and environmental sensors in a virtual environment, examples of which are shown in FIGS. 4-6. FIG. 4 illustrates an exemplary virtual environment composed of intelligence reports, real-time vehicle telemetry information, and geospatial data. FIG. 5 illustrates an exemplary three-dimensional virtual environment in which users are able to move about freely, with imagery and terrain data rendered in real-time. Geospatial event management system 100 can also integrate guard force tools and real-time tracking. For example, FIG. 6 illustrates an exemplary three-dimensional virtual environment displaying real-time temporal tracking information.

Figure 7:
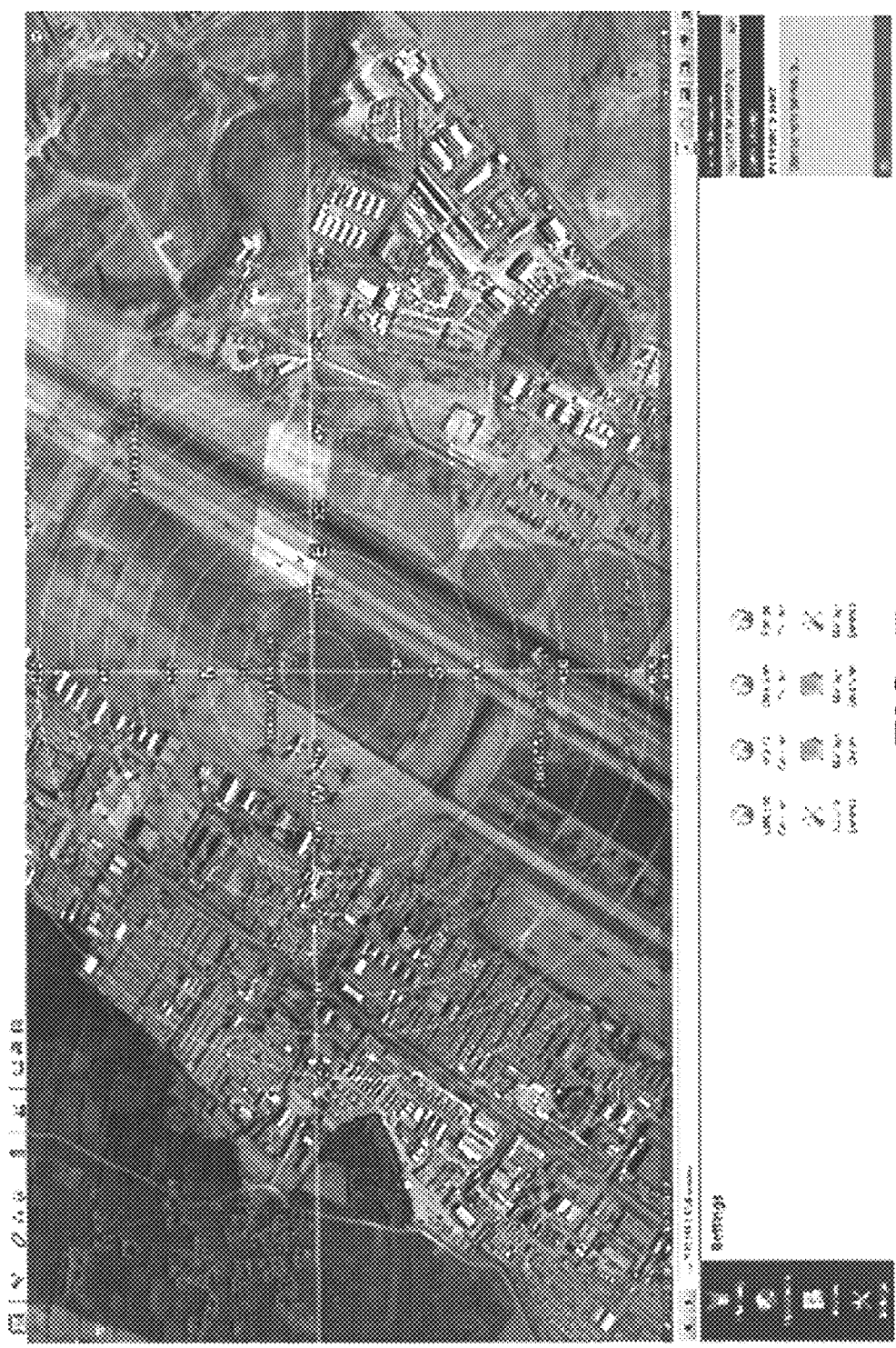
Figure 8:
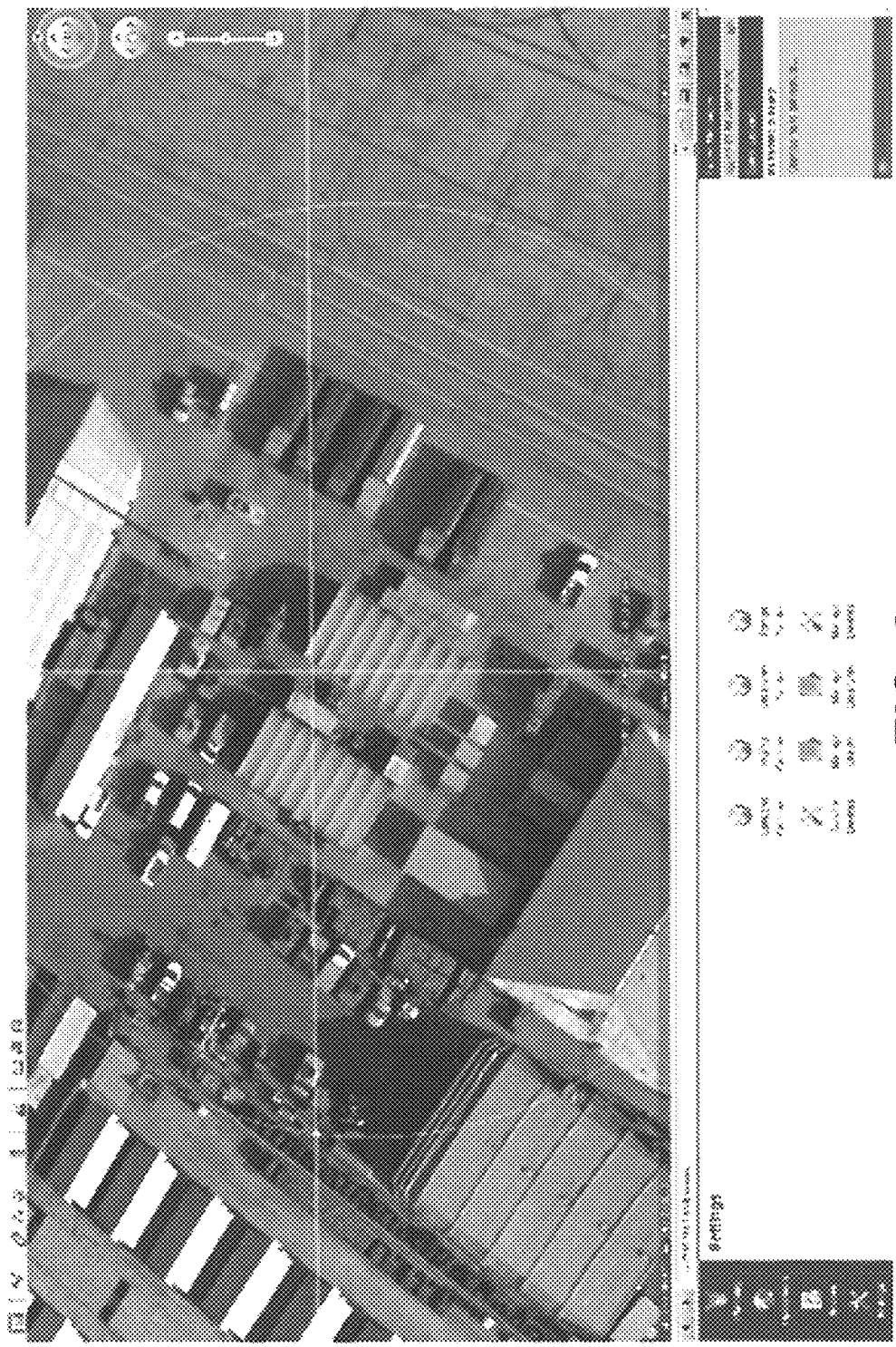
Figure 9:
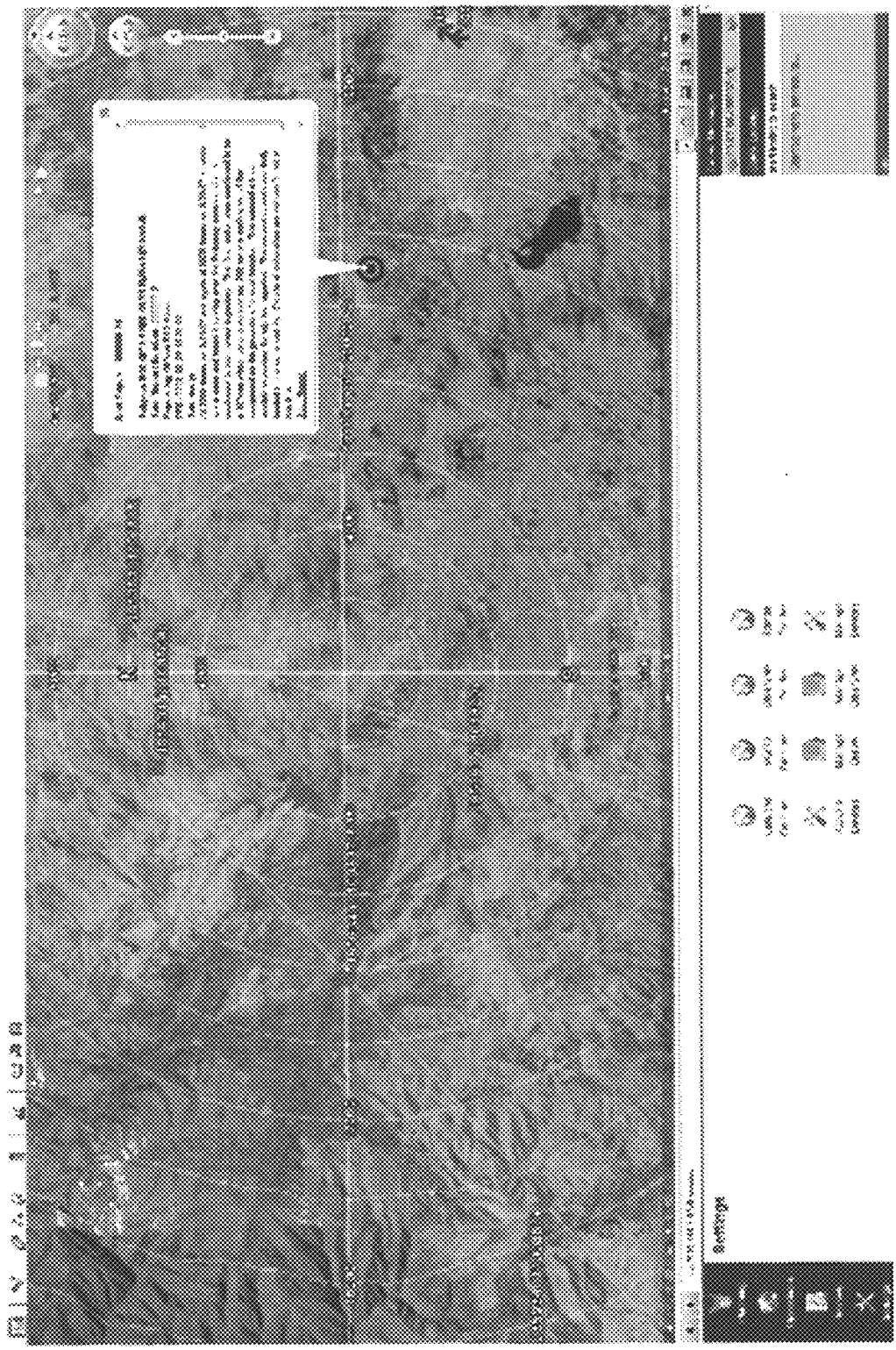

Geospatial event management system 100 can also be integrated into disparate databases and other data sources to facilitate entity-centric analytics in a geospatial context and provide geospatial analytic capability to users. Users can exploit the geospatial analytic capability to, for example, create and manage information reports, such as an exemplary spot report as shown in FIG. 3. Users can also exploit the geospatial analytic capability to find geographically relevant information with geospatial and/or temporal filters, examples of which are shown in FIGS. 7-10. Exemplary geospatial filters include latitude/longitude, military grid reference system grid, one or more points of reference, radius, simple and complex polygons, and the like. FIG. 7 illustrates an exemplary dynamic range overlay draped over imagery and real-time tracking data. FIG. 8 illustrates an exemplary capability of geospatial event management system 100 to use the dynamic range overlay as shown in FIG. 7 as a geospatial filter and zoom in on assets and personnel near the center of the dynamic range overlay. FIG. 9 illustrates an exemplary real-time common operational picture provided by geospatial event management system 100 that combines intelligence and real-time telemetry data.

Figure 10:
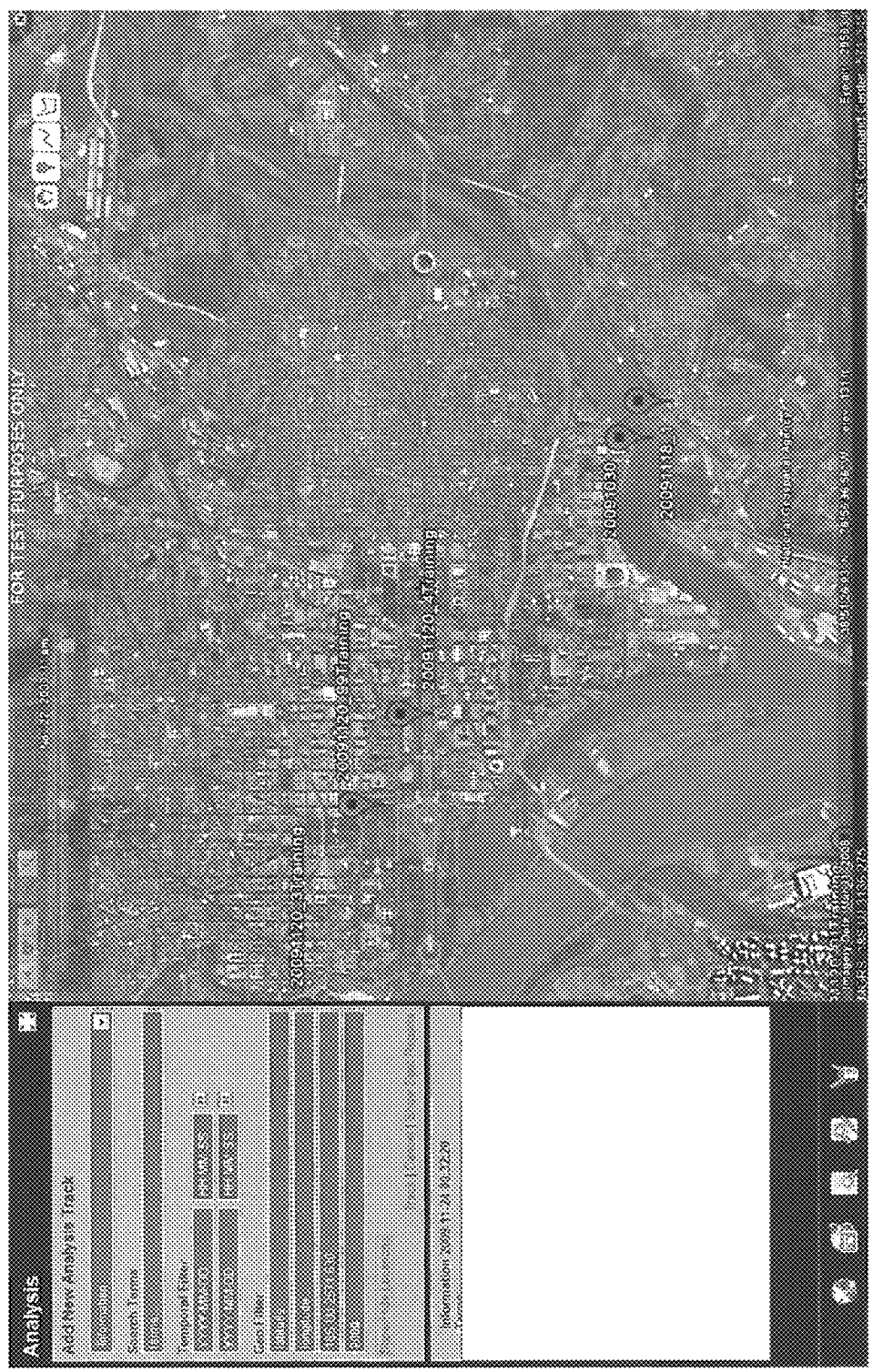
Figure 12:
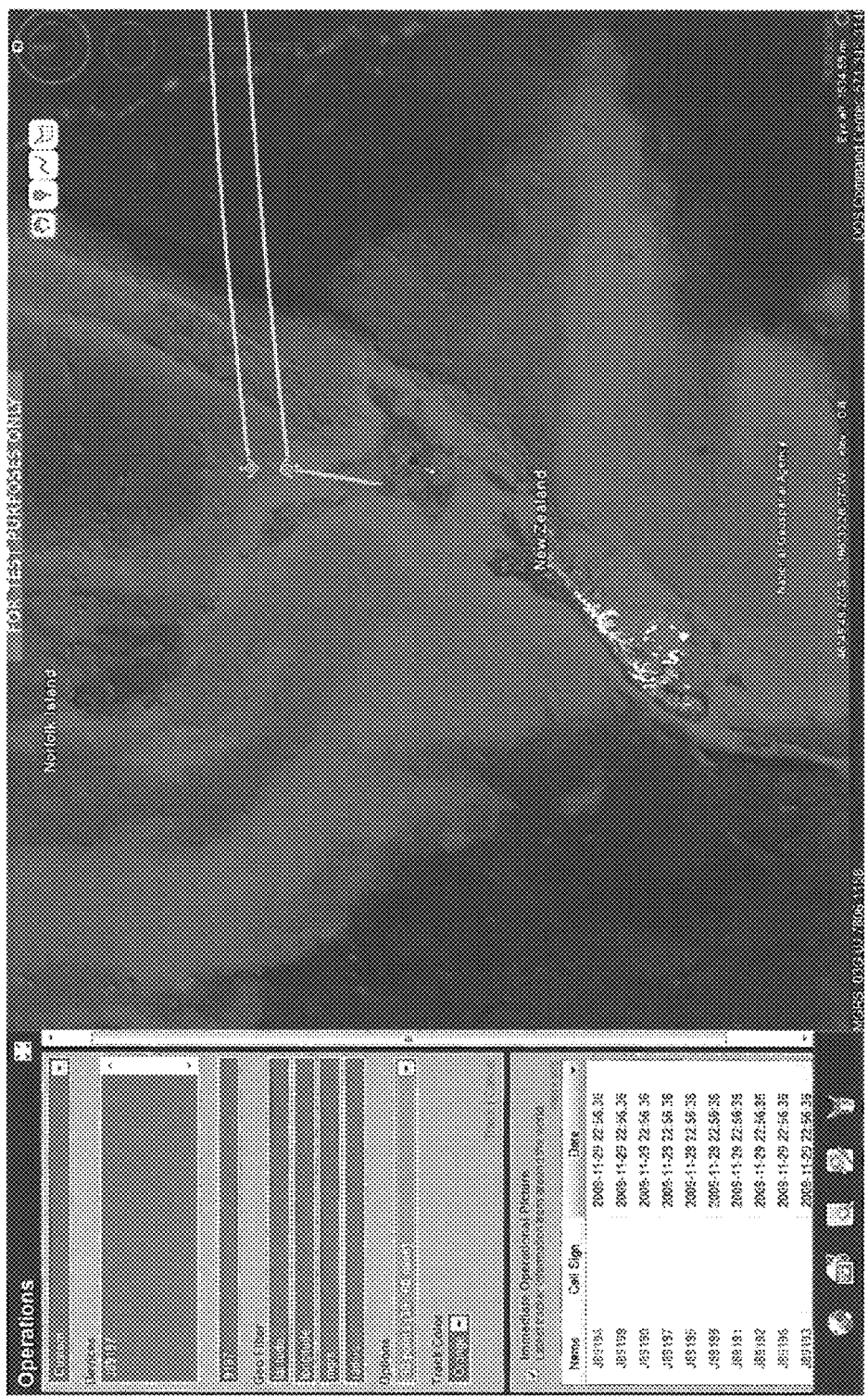
Figure 13:
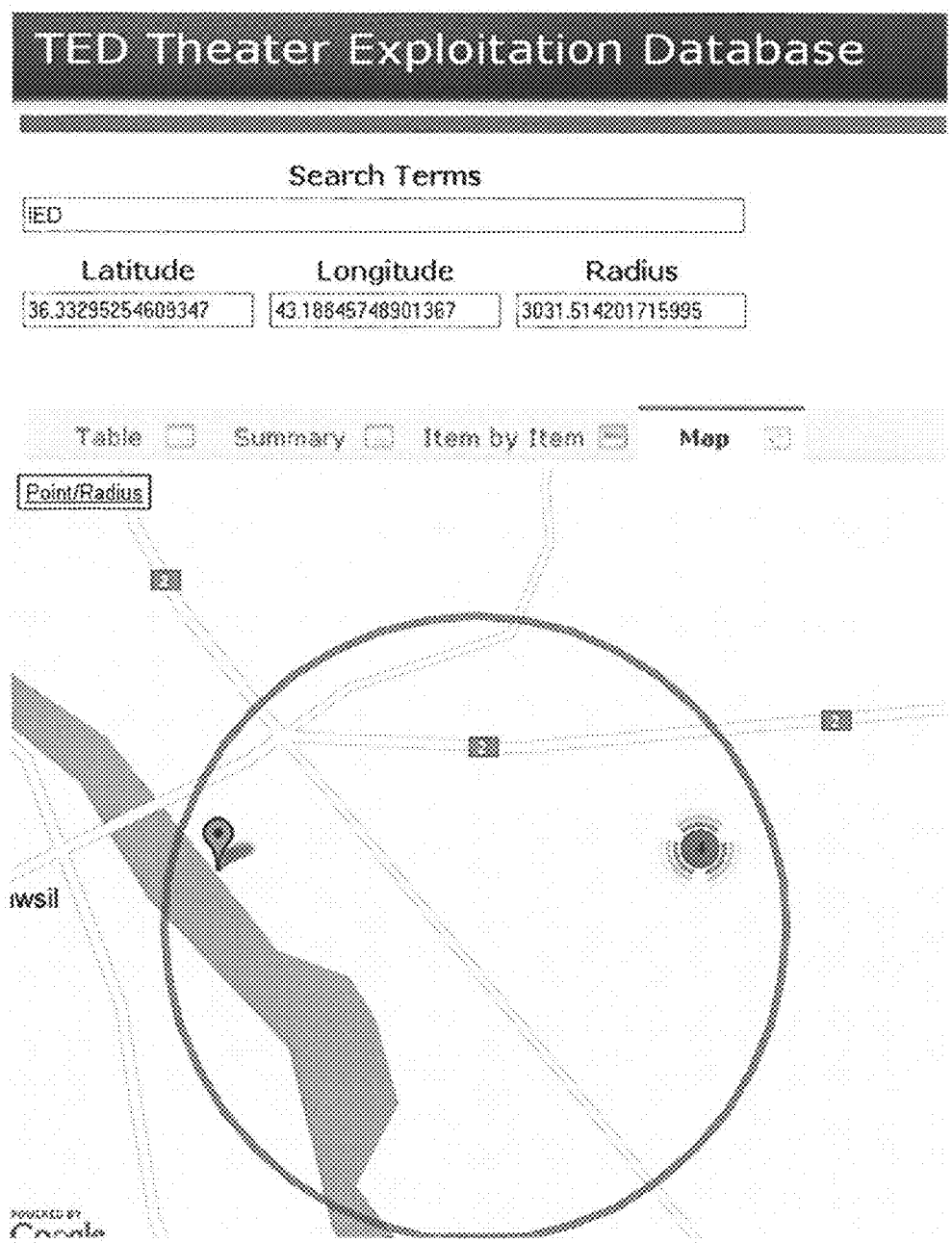

Users can further exploit the geospatial analytic capability to find logically and topically relevant information with full text search and date/time filters, example of which are shown in FIGS. 10, 12, and 13; to manage properties of objects in a collection, an example of which is shown in FIG. 11; and to conduct buffered route analysis, an example of which is shown in FIG. 12. FIG. 10 illustrates an exemplary user interface for adding a new analysis track for performing pre/post-mission analytical activities. FIG. 11 illustrates an exemplary user interface in which users can view, modify, and/or manage properties of objects in a collection, e.g., color codes of objects representing various training locations. FIG. 12 illustrates an exemplary user interface in which users can monitor and track units and assets within a geospatial environment in real-time. FIG. 13 illustrates an exemplary user interface for users to specify a theater based on search terms, latitude/longitude, radius, etc., and then access and view event and tracking data in the specified theater.

FIG. 14 illustrates a computer system 1400 that is consistent with embodiments of the present teachings. In general, embodiments of geospatial event management system 100 may be implemented in various computer systems, such as a personal computer, a server, a workstation, an embedded system, or a combination thereof, for example, computer system 1400. Certain embodiments of geospatial event management system 100 may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 1400 is shown as a general purpose computer that is well known to those skilled in the art. Examples of the components that may be included in system 1400 will now be described.

As shown, system 1400 may include at least one processor 1402, a keyboard 1417, a pointing device 1418 (e.g., a mouse, a touchpad, and the like), a display 1416, main memory 1410, an input/output controller 1415, and a storage device 1414. Storage device 1414 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of geospatial event management system 100 can be stored on, for example, storage device 1414. System 1400 may also be provided with additional input/output devices, such as a printer (not shown). The various components of system 1400 communicate through a system bus 1412 or similar architecture. In addition, system 1400 may include an operating system (OS) 1420 that resides in memory 1410 during operation. One skilled in the art will recognize that system 1400 may include multiple processors 1402. For example, system 1400 may include multiple copies of the same processor. Alternatively, system 1400 may include a heterogeneous mix of various types of processors. For example, system 1400 may use one processor as a primary processor and other processors as co-processors. For another example, system 1400 may include one or more multi-core processors and one or more single core processors.

Thus, system 1400 may include any number of execution cores across a set of processors (e.g., processor 1402). As to keyboard 1417, pointing device 1418, and display 1416, these components may be implemented using components that are well known to those skilled in the art. One skilled in the art will also recognize that other components and peripherals may be included in system 1400.

Main memory 1410 serves as a primary storage area of system 1400 and holds data that is actively used by applications, such as geospatial event management system 100, running on processor 1402. One skilled in the art will recognize that applications are software programs that each contains a set of computer instructions for instructing system 1400 to perform a set of specific tasks during runtime, and that the term "applications" may be used interchangeably with application software, application programs, and/or programs in accordance with embodiments of the present teachings. Memory 1410 may be implemented as a random access memory or other forms of memory as described below, which are well known to those skilled in the art.

OS 1420 is an integrated collection of routines and instructions that are responsible for the direct control and management of hardware in system 1400 and system operations. Additionally, OS 1420 provides a foundation upon which to run application software. For example, OS 1420 may perform services, such as resource allocation, scheduling, input/output control, and memory management. OS 1420 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 1402), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined. The scope of the present teachings is accordingly intended to be limited only by the following claims.

What is claimed is:

1. A method of providing geospatial management and visualization of one or more events, comprising:
    accessing geospatial imagery data from one or more geospatial imagery data sources;
    providing a plurality of user-interactive three-dimensional geospatial environments based on the geospatial imagery data, wherein the plurality of geospatial environments share one or more display parameters;
    receiving event data associated with the one or more events;
    providing the event data to be fused with the geospatial imagery data into fused data for display in the plurality of geospatial environments;
    receiving at least one interface display parameter via a first geospatial environment of the plurality of geospatial environments subsequent to providing the event data, wherein the at least one interface display parameter includes at least one of a zoom level of the display of the fused data in the first geospatial environment, a tilt parameter for tilting the display of the fused data in the first geospatial environment, or a panning parameter for panning the display of the fused data in the first geospatial environment;
    updating, in real-time, the one or more display parameters of the plurality of geospatial environments based on the at least one interface display parameter, thereby causing the plurality of geospatial environments to provide a common visualization of at least a portion of the fused data in accordance with the at least one interface display parameter received via the first geospatial environment;

receiving a time span via a second geospatial environment of the plurality of geospatial environments;

determining a series of events associated with the time span;

scrolling through the time span in response to input received via the second geospatial environment; and playing back data associated with the series of events that satisfy the input, superimposed over the geospatial imagery data, in the plurality of geospatial environments, thereby causing the plurality of geospatial environments to provide, in real-time, a common visualization of at least a portion of the data associated with the series of events.

2. The method of claim 1, wherein the event data is geospatially-referenced.

3. The method of claim 2, wherein the event data includes at least one of tracking data, telemetry data, or sensor data.

4. The method of claim 1, further comprising:

receiving an interface display parameter via a second geospatial environment of the plurality of geospatial environments subsequent to providing the event data, wherein the interface display parameter include at least one of a zoom level of the display of the fused data in the second geospatial environment, a tilt parameter for tilting the display of the fused data in the second geospatial environment, or a panning parameter for panning the display of the fused data in the second geospatial environment; and updating, in real-time, the one or more display parameters of the plurality of geospatial environments based on the interface display parameter, thereby causing the plurality of geospatial environments to provide a common visualization of at least a part of the fused data in accordance with the interface display parameter received via the second geospatial environment.

5. The method of claim 1, wherein the at least one interface display parameter includes a time span, and wherein the method further comprises:

determining, from the event data, a series of events associated with the time span; and providing, in real-time, data associated with the series of events superimposed over the geospatial imagery data in the plurality of geospatial environments.

6. The method of claim 1, further comprising:

determining a geographic area of interest based on the at least one interface display parameter.

7. The method of claim 6, wherein providing the event data further comprises:

providing the event data superimposed over the geospatial imagery data associated with the geographic area of interest.

8. A system for providing geospatial management and visualization of one or more events, comprising:

a server configured to:

access geospatial imagery data from one or more geospatial imagery data sources;

provide a plurality of user-interactive three-dimensional geospatial environments based on the geospatial imagery data, wherein the plurality of geospatial environments share one or more display parameters;

receive event data associated with the one or more events;

provide the event data to be fused with the geospatial imagery data into fused data for display in the plurality of geospatial environments;

receive at least one interface display parameter via a first geospatial environment of the plurality of geospatial environments subsequent to providing the event data, wherein the at least one interface display parameter includes at least one of a zoom level of the display of the fused data in the first geospatial environment, a tilt parameter for tilting the display of the fused data in the first geospatial environment, or a panning parameter for panning the display of the fused data in the first geospatial environment;

update, in real-time, the one or more display parameters of the plurality of geospatial environments based on the at least one interface display parameter, thereby causing the plurality of geospatial environments to provide a common visualization of at least a portion of the fused data in accordance with the at least one interface display parameter received via the first geospatial environment;

receive a time span via a second geospatial environment of the plurality of geospatial environments;

determine, from the event data, a series of events associated with the time span;

scroll through the time span in response to input received via the second geospatial environment; and play back data associated with the series of events that satisfy the input, superimposed over the geospatial imagery data, in the plurality of geospatial environments, thereby causing the plurality of geospatial environments to provide, in real-time, a common visualization of at least a portion of the data associated with the series of events.

9. The system of claim 8, wherein the server is further configured to:

receive an interface display parameter via a second geospatial environment of the plurality of geospatial environments subsequent to providing the event data, wherein the interface display parameter include at least one of a zoom level of the display of the fused data in the second geospatial environment, a tilt parameter for tilting the display of the fused data in the second geospatial environment, or a panning parameter for panning the display of the fused data in the second geospatial environment; and update, in real-time, the one or more display parameters of the plurality of geospatial environments based on the interface display parameter, thereby causing the plurality of geospatial environments to provide a common visualization of at least a part of the fused data in accordance with the interface display parameter received via the second geospatial environment.

10. A computer program product, comprising:

a non-transitory computer-readable medium storing instructions that cause a computer to provide geospatial management and visualization when executed by the computer, comprising:

at least one instruction for causing the computer to access geospatial imagery data from one or more geospatial imagery data sources;

at least one instruction for causing the computer to provide a plurality of user-interactive three-dimensional geospatial environments based on the geospatial imagery data, wherein the plurality of geospatial environments share one or more display parameters;

at least one instruction for causing the computer to receive event data associated with the one or more events;

at least one instruction for causing the computer to provide the event data to be fused with the geospatial imagery data into fused data for display in the plurality of geospatial environments;

at least one instruction for causing the computer to receive at least one interface display parameter via a first geospatial environment of the plurality of geospatial environments subsequent to providing the event data, wherein the at least one interface display parameter includes at least one of a zoom level of the display of the fused data in the first geospatial environment, a tilt parameter for tilting the display of the fused data in the first geospatial environment, or a panning parameter for panning the display of the fused data in the first geospatial environment;

at least one instruction for causing the computer to update, in real-time, the one or more display parameters of the plurality of geospatial environments based on the at least one interface display parameter, thereby causing the plurality of geospatial environments to provide a common visualization of at least a portion of the fused data in accordance with the at least one interface display parameter received via the first geospatial environment at least one instruction for causing the computer to receive a time span via a second geospatial environment of the plurality of geospatial environments;

at least one instruction for causing the computer to determine, from the event data, a series of events associated with the time span;

at least one instruction for causing the computer to scroll through the time span in response to input received via the second geospatial environment; and at least one instruction for causing the computer to play back data associated with the series of events that satisfy the input, superimposed over the geospatial imagery data, in the plurality of geospatial environments, thereby causing the plurality of geospatial environments to provide, in real-time, a common visualization of at least a portion of the data associated with the series of events.

11. The computer program product of claim 10, wherein the computer-readable medium further comprises:

at least one instruction for causing the computer to receive an interface display parameter via a second geospatial environment of the plurality of geospatial environments subsequent to providing the event data, wherein the interface display parameter include at least one of a zoom level of the display of the fused data in the second geospatial environment, a tilt parameter for tilting the display of the fused data in the second geospatial environment, or a panning parameter for panning the display of the fused data in the second geospatial environment; and at least one instruction for causing the computer to update, in real-time, the one or more display parameters of the plurality of geospatial environments based on the interface display parameter, thereby causing the plurality of geospatial environments to provide a common visualization of at least a part of the fused data in accordance with the interface display parameter received via the second geospatial environment.

* * * * *